United States Patent [19]
Matsunaga

[11] Patent Number: 6,005,237
[45] Date of Patent: Dec. 21, 1999

[54] SOLID-STATE IMAGING APPARATUS WHICH PRODUCES A SEQUENTIALLY-SCANNED VIDEO SIGNAL

[75] Inventor: Osamu Matsunaga, Kanagawa, Japan

[73] Assignee: Sony Corporation, Tokyo, Japan

[21] Appl. No.: 09/035,701

[22] Filed: Mar. 5, 1998

[30] Foreign Application Priority Data

Mar. 12, 1997 [JP] Japan ................................ 9-058046

[51] Int. Cl.[6] .................................................. H04N 3/14
[52] U.S. Cl. ................................. 250/208.1; 348/306
[58] Field of Search ........................... 250/208.1, 214 R,
250/214.1; 348/294, 298, 302–306, 575, 571

[56] References Cited

U.S. PATENT DOCUMENTS

| 4,768,098 | 8/1988 | Vogelsong ........................... 348/306 |
| 4,992,852 | 2/1991 | Sekizawa et al. ..................... 348/455 |
| 5,029,001 | 7/1991 | Tanaka et al. ....................... 348/447 |

*Primary Examiner*—Stephone Allen
*Attorney, Agent, or Firm*—Frommer Lawrence & Haug, LLP.; William S. Frommer

[57] ABSTRACT

A solid-state imaging apparatus produces a sequentially-scanned video signal without using an expensive scanning converter. In the apparatus, an imaging device produces an image signal of each line based on the summation of signal charges of two adjacent lines. With the first mode being selected by the operation on the key panel, a timing generator is controlled to generate vertical shift pulses (field readout pattern) such that the two adjacent lines of the alternately-consecutive first and second fields are equal, causing the imaging device to produce an image signal for obtaining a sequentially-scanned video signal. An image signal processor implements the gamma modification process, etc. for the image signal to obtain the sequentially-scanned video signal. Sync signals VD and HD for sequential scanning or skip scanning generated by a sync signal generator are added to the video signal, and the output video signal is obtained.

11 Claims, 9 Drawing Sheets

| (SVi) | (FIRST FRAME OF SVn) | (SECOND FRAME OF SVn) |
| FIG3.A | FIG3.B | FIG3.C |

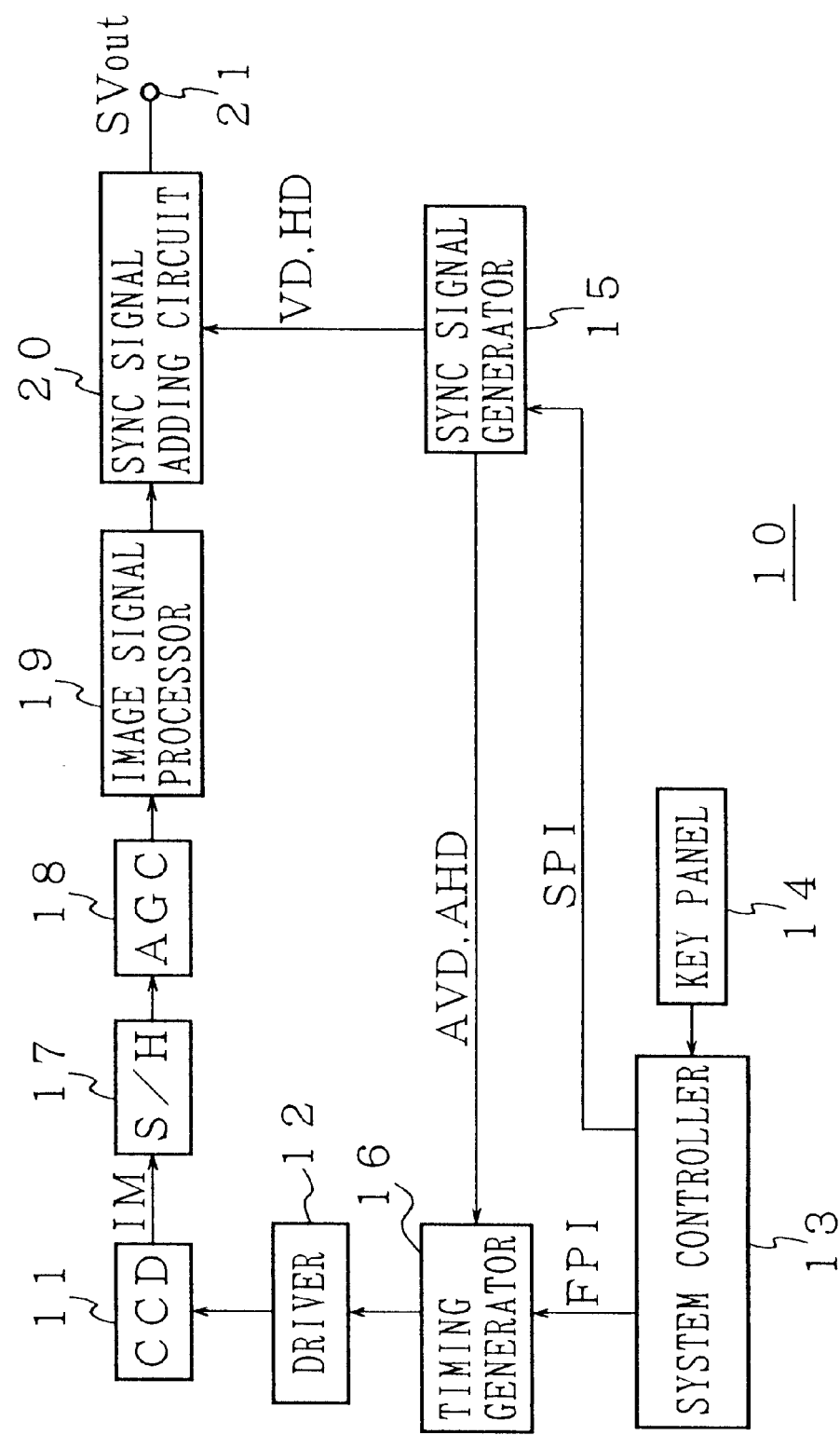

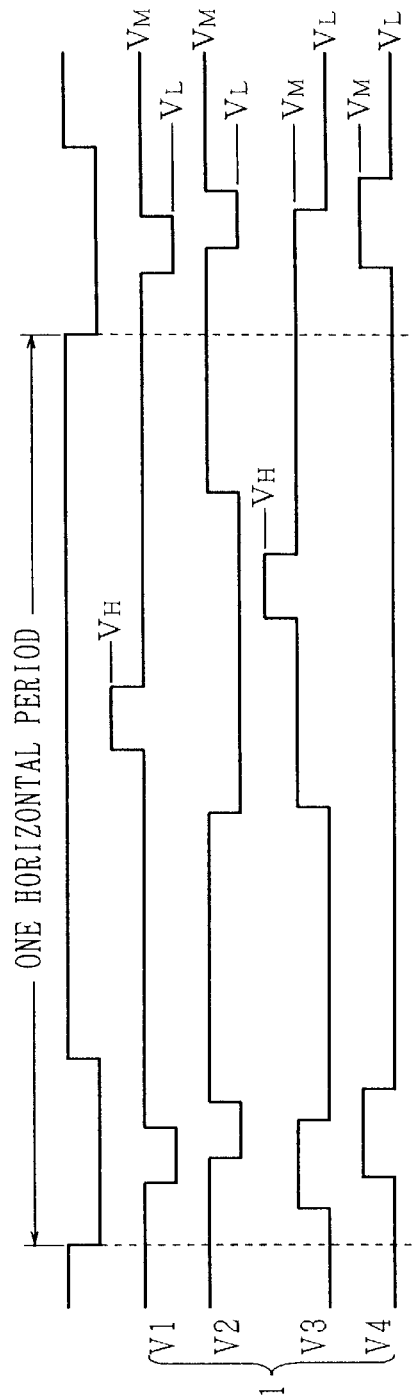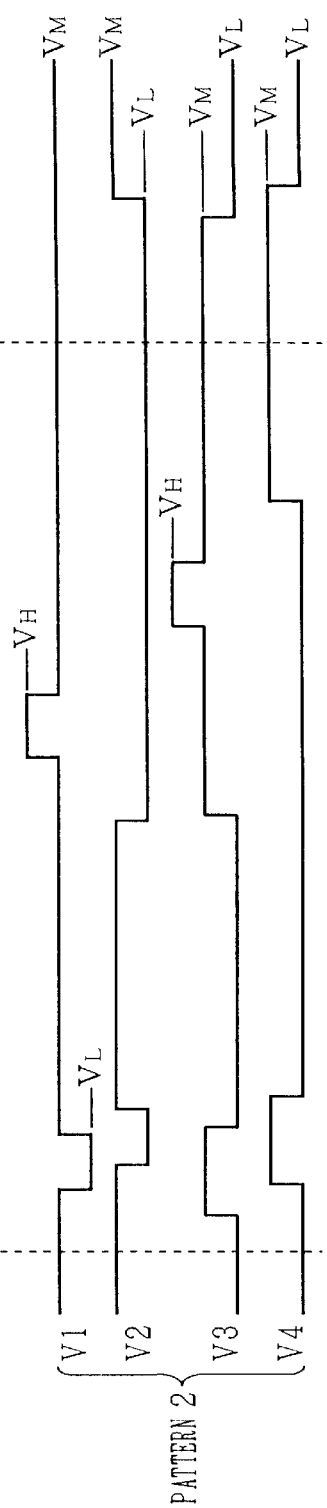

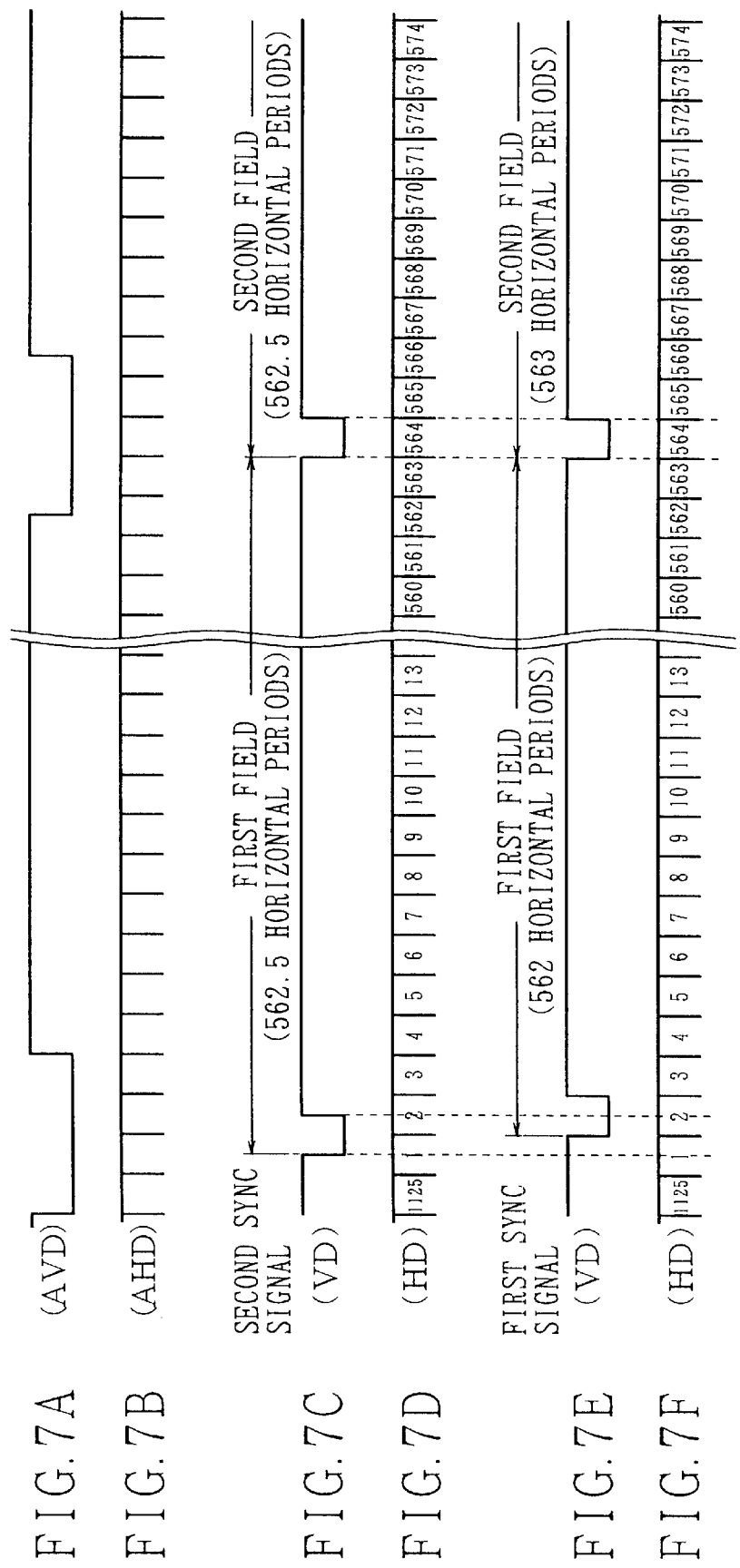

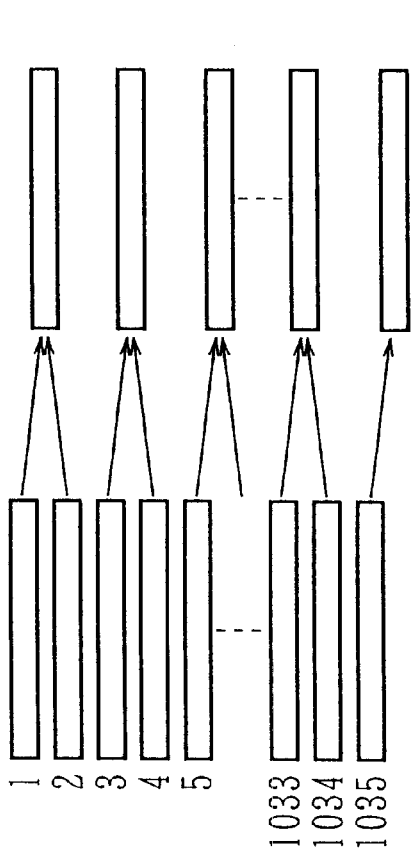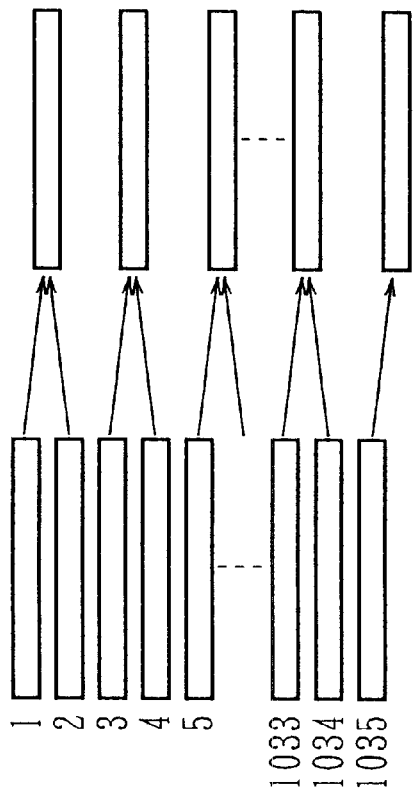

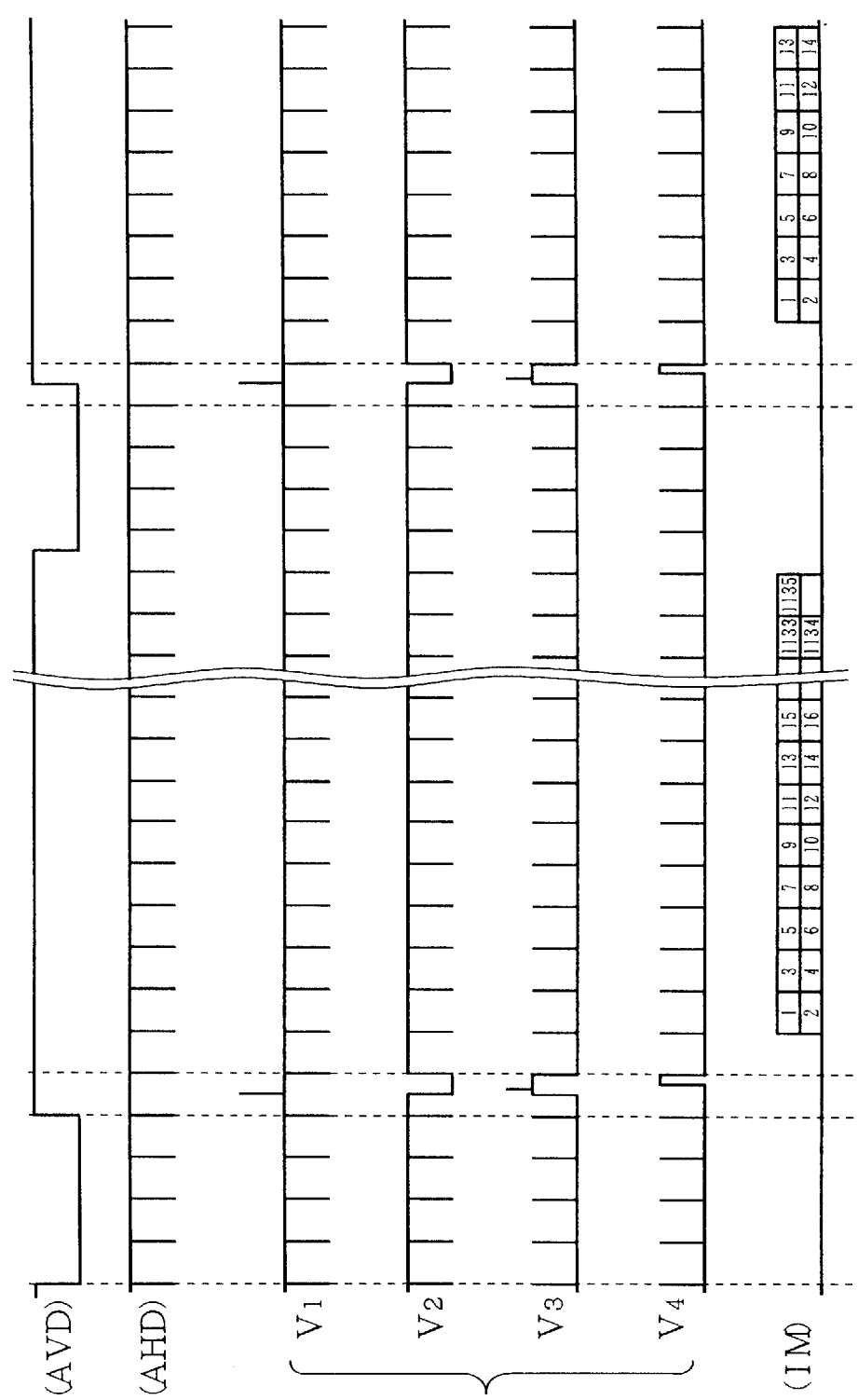
FIG.9A (AVD)
FIG.9B (AHD)
FIG.9C V1 V2 V3 V4
FIG.9D (IM)

(LINE ARRANGEMENT)  (IM OF FIRST FIELD)

(LINE ARRANGEMENT)  (IM OF SECOND FIELD)

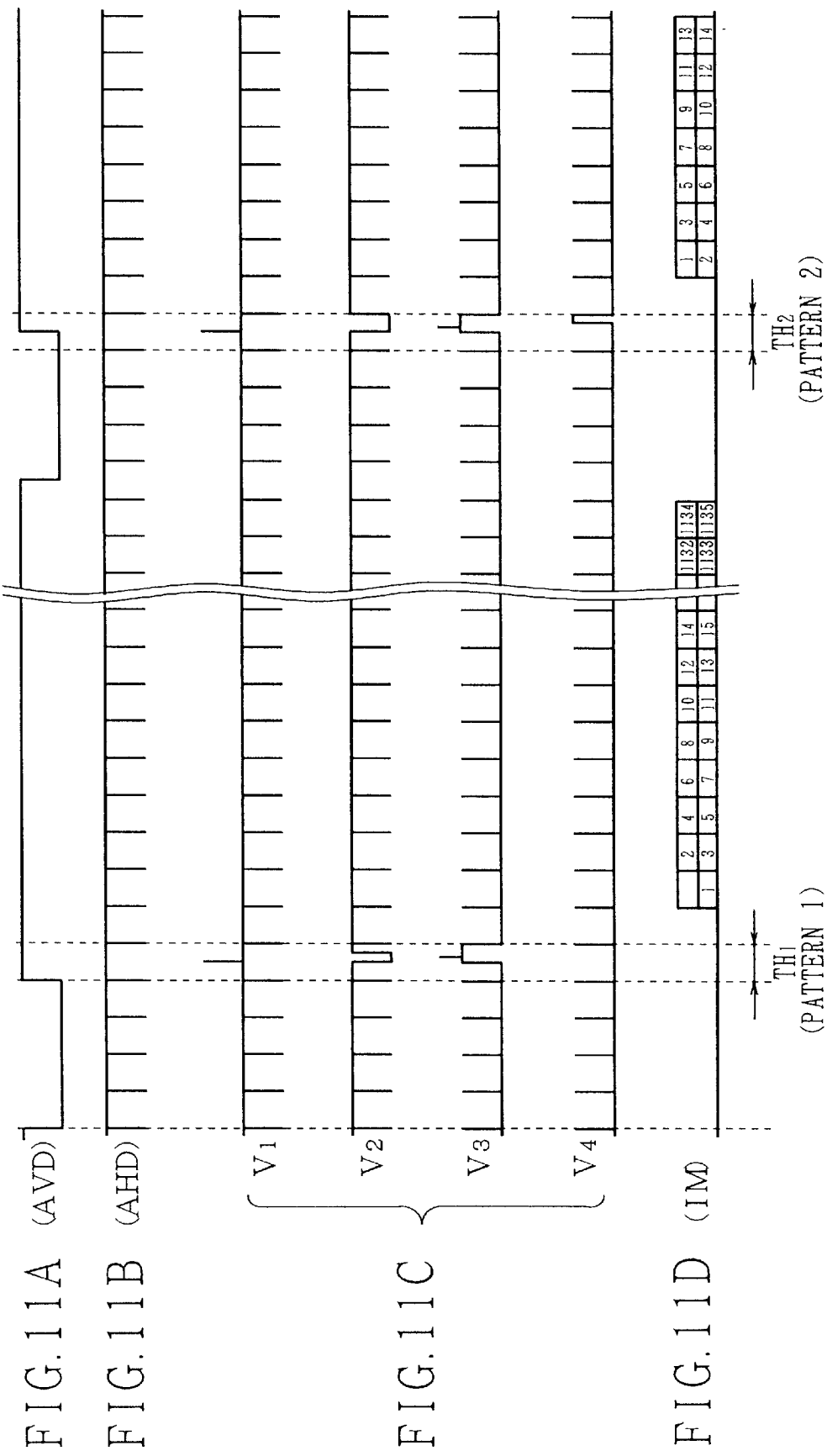

SOLID-STATE IMAGING APPARATUS WHICH PRODUCES A SEQUENTIALLY-SCANNED VIDEO SIGNAL

BACKGROUND OF THE INVENTION

1. Field of the Invention

The present invention relates to a solid-state imaging apparatus using a CCD-based solid-state imaging device or the like. Particularly, the invention relates to a solid-state imaging apparatus in which a solid-state imaging device produces an image signal based on the summation of signal charges of two adjacent lines, and is driven such that the two adjacent lines of the alternately-consecutive first and second fields are equal, thereby obtaining a sequentially-scanned video signal without using an expensive scanning converter, etc.

2. Description of the Prior Art

FIG. 1 shows the arrangement of a conventional system for producing a sequentially-scanned video signal. The system consists of a CCD-based solid-state imaging device 101 which produces a skip-scanned video signal SVi, and a scanning converter 102 which processes the skip-scanned video signal SVi to produce a sequentially-scanned video signal SVn.

FIG. 2 shows the arrangement of the scanning converter 102. The scanning converter 102 has an input terminal 121 on which the skip-scanned video signal SVi is supplied, a line memory 122 which delays the input video signal SVi by one horizontal period, and an adder 123 and factor operator 124 by which the input video signal SVi and the delayed video signal provided by the line memory 122 are summed and averaged into a video signal SVa.

The scanning converter 102 further includes a switch circuit 125 which selects the input video signal SVi or the video signal SVa provided by the factor operator 124, and an output terminal 126 which releases the output video signal provided by the switch circuit 125. The factor operator 124 has its output connected to the a-input terminal of the switch circuit 125, and the input terminal 121 is connected to the b-input terminal of the switch circuit 125. The switch circuit 125 is supplied with a switch control signal SW, and it turns to select its a-input or b-input in correspondence to the alternately-consecutive first and second fields of the video signal SVi in response to the signal SW.

In one case, the system receives the skip-scanned video signal SVi on the input terminal 121. FIG. 3A shows line signals of the video signal SVi, with the solid lines and dashed lines signifying the line signals of the first field and second field, respectively. For the first field, the switch circuit 125 selects its b-input to provide as sequentially-scanned video signal SVn the first frame signal (shown in FIG. 3B) derived from a line signal of the video signal SVi. For the second field, the switch circuit 125 selects its a-input to provide as sequentially-scanned video signal SVn the second frame signal (shown in FIG. 3C) derived from a line signal of the video signal SVa. The sequentially-scanned video signal SVn is output from the output terminal 126.

This conventional system shown in FIG. 1 has a problem of needing an expensive scanning converter 102, which includes a line memory 122 as shown in FIG. 2, for producing the sequentially-scanned video signal SVn.

SUMMARY OF THE INVENTION

An object of the present invention is to provide a solid-state imaging apparatus which is capable of producing a sequentially-scanned video signal without using an expensive scanning converter.

The invention resides in a solid-state imaging apparatus comprising a solid-state imaging device which produces an image signal of each line based on the summation of signal charges of two adjacent lines, a drive means which drives the solid-state imaging device, a control means which controls the drive means such that, with every second line being numbered line n, the two adjacent lines of the alternately-consecutive first and second fields are line n and line n−1, or line n and line n+1, and a signal processing means which processes the image signal provided by the solid-state imaging device to produce a sequentially-scanned video signal of m/2 lines (m is an odd number).

For each of the alternately-consecutive first and second fields, the solid-state imaging device produces an image signal of each line sequentially based on the summation of signal charges of two adjacent lines. The driving of the imaging device is controlled such that, with every second line, e.g., odd-numbered line or even-numbered line, being numbered line n, the two adjacent lines of the first and second fields are line n and line n−1, or line n and line n+1. Consequently, the imaging device produces image signals of the same line position of the first and second fields, and the sequentially-scanned video signal of m/2 lines can be obtained from the signal processing means.

By controlling the driving of the imaging device such that the two adjacent lines are line n and line n−1 for the first field and are line n and line n+1 for the second field, the imaging device produces image signals with the relation of alternate line positions for the first and second fields, causing the signal processing means to produce a skip-scanned video signal of m lines. By controlling the driving of the imaging device, it becomes possible to select the mode of obtaining the sequentially-scanned video signal or the mode of obtaining the skip-scanned video signal.

According to this invention, the solid-state imaging device produces an image signal of each line based on the summation of signal charges of two adjacent lines, and is driven such that the two adjacent lines of the alternately-consecutive first and second fields are equal, whereby it is possible to obtain the sequentially-scanned video signal without using an expensive scanning converter, etc.

According to this invention, the solid-state imaging device produces an image signal of each line based on the summation of signal charges of two adjacent lines, and is driven such that the two adjacent lines of the alternately-consecutive first and second fields are equal in the first mode and driven such that the two adjacent lines of the first and second fields are unequal in the second mode, whereby it is possible for the user to obtain the sequentially-scanned video signal or skip-scanned video signal arbitrarily and easily by merely selecting a mode.

BRIEF DESCRIPTION OF THE DRAWINGS

FIGS. 3A, 3B and 3C are diagrams used to explain the operation of scanning conversion of the scanning converter;

FIG. 4 is a lock diagram showing the arrangement of the solid-state imaging apparatus based on an embodiment of this invention;

FIGS. 6A, 6B and 6C are timing charts showing specifically the field readout patterns (pattern 1 and pattern 2);

FIGS. 7A through 7F are timing charts showing a first synchronizing (sync) signal for sequential scanning and a second sync signal for skip scanning;

FIGS. 8A through 8D are diagrams used to explain the image signals of the first and second fields when the first mode is selected;

FIGS. 9A through 9D are timing charts used to explain the operation when the first mode is selected;

FIGS. 11A through 11D are timing charts used to explain the operation when the second mode is selected.

DESCRIPTION OF THE PREFERRED EMBODIMENT

An embodiment of the present invention will be explained with reference to the drawings.

FIG. 4 shows the arrangement of a solid-state imaging apparatus 10 based on this embodiment. It produces a sequentially-scanned video signal SVn of 562.5 lines in the first mode and produces a skip-scanned video signal SVi of 1125 lines in the second mode.

The solid-state imaging apparatus 10 includes a solid-state imaging device 11 of CCD (charge coupled device), and a driver 12 which drives the imaging device 11 by supplying it with such timing signals as vertical shift pulses V1 to V4 and horizontal shift pulses H1 and H2 generated by a timing generator which will be explained later. In this embodiment, the imaging device 11 is of the inter-line transfer type, and it has 1035 lines.

Figure 1:
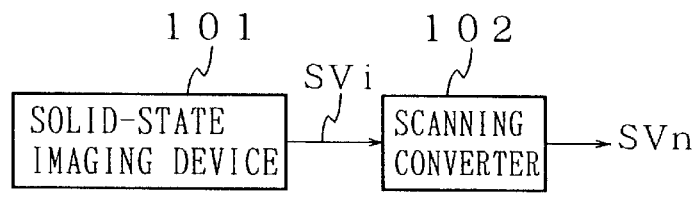
FIG. 1 is a block diagram showing the arrangement of a conventional system for producing a sequentially-scanned video signal.
Figure 2:
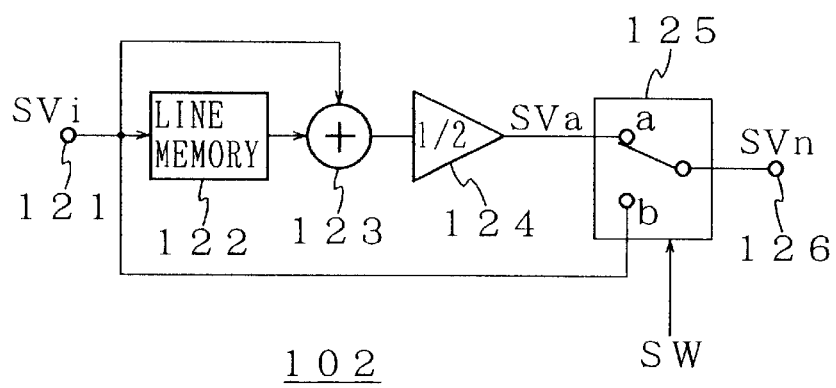
FIG. 2 is block diagram showing the arrangement of the scanning converter used in the system.
Figure 5:
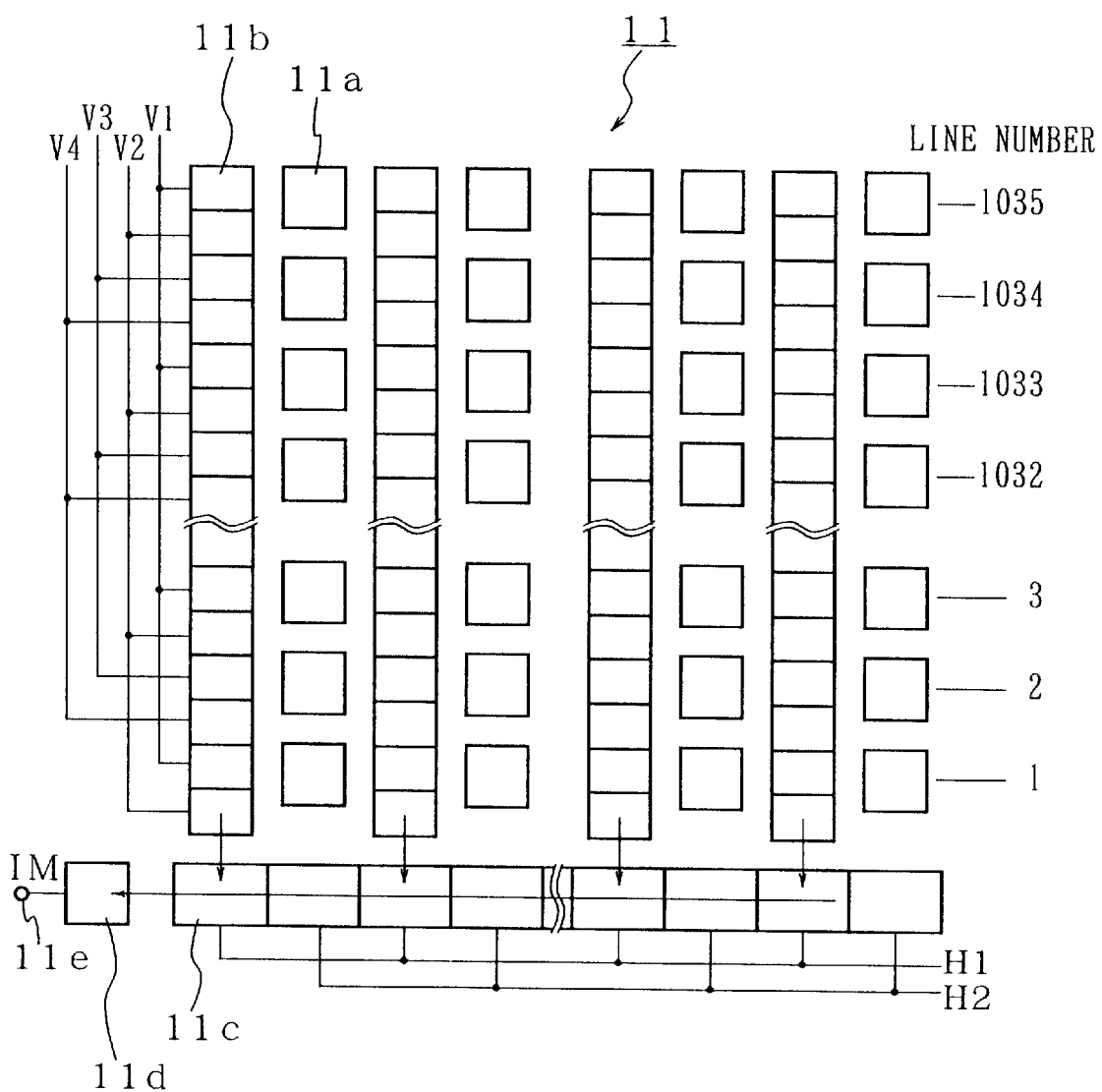
FIG. 5 is a block diagram showing the structure of the CCD-based solid-state imaging device of the inter-line transfer type.

FIG. 5 shows the arrangement of the imaging device 11 formed of photodiodes. The imaging device 11 consists of sensors 11a which store signal charges in correspondence to the image of a subject, vertical shift registers 11b which shift in the vertical direction the signal charges read out of the sensors 11a, a horizontal shift register 11c which shifts in the horizontal direction the signal charges which have been shifted down by the vertical shift registers 11b, a signal detector 11d which detects as voltage signals the signal charges shifted by the horizontal shift register 11c, and an output terminal 11e which outputs the voltage signals detected by the signal detector 11d as an image signal IM. The vertical shift registers 11b have their electrodes supplied with the vertical shift pulses V1 to V4 and the horizontal shift register 11c has its electrodes supplied with the horizontal shift pulses H1 and H2 so that signal charges are shifted by 2-phase driving.

Signal charges stored in the sensors 11a are read out into the vertical shift registers 11b during the vertical blanking period and shifted in the vertical direction in response to the vertical shift pulses V1 to V4, and signal charges for one line are fed into the horizontal shift register 11c in every horizontal blanking period. The signal charges of one line held by the horizontal shift register 11c are shifted in the horizontal direction into the signal detector 11d in response to the horizontal shift pulses H1 and H2 in the successive horizontal periods. Accordingly, the signal detector 11d produces and delivers an image signal of one line to the output terminal 11e in every horizontal period.

The solid-state imaging apparatus 10 further includes a system controller 13 which controls the operation of the whole system, and a key panel 14 which is connected to the system controller 13. The key panel 14 is operated by the user for the selection of a mode and a sync signal. Operation modes selected by the user include the first mode for producing the sequentially-scanned video signal SVn and the second mode for producing the skip-scanned video signal SVi. Sync signals selected by the user include a first sync signal for sequential scanning and a second sync signal for skip scanning, one of which is added to the video signal output from the image signal processor which will be explained later.

The solid-state imaging apparatus 10 further includes a sync signal generator 15 which generates a horizontal and vertical drive signals AHD and AVD and a horizontal and vertical sync signals HD and VD which are synchronous with the drive signals AHD and AVD, respectively, and a timing signal generator 16 which receives the drive signals AHD and AVD generated by the sync signal generator 15 and generates such timing signals used by the imaging device 11 as vertical shift pulses V1 to V4 and horizontal shift pulses H1 and H2 which are synchronous with the drive signals AHD and AVD, respectively.

The timing signal generator 16 is supplied from the system controller 13 in correspondence to the selected mode with a signal FPI for designating a field readout pattern (pattern of vertical shift pulses V1 to V4 for the readout operation). With the first mode being selected, the pattern designation signal FPI specifies pattern 2 as a readout pattern for the first and second fields. With the second mode being selected, it specifies pattern 1 as a readout pattern for the first field and pattern 2 as a readout pattern for the second field.

Among the vertical shift pulses V1 to V4, the V2 and V4 can have two values of VL and VM (VL<VM), while the V1 and V3 are 3-value pulses which can have three values of VL, VM and VH (VL<VM<VH).

FIG. 6A shows the horizontal drive signal AHD, and FIG. 6B shows the vertical shift pulses V1 to V4 of pattern 1. With pattern 1 being applied to the imaging device 11, first signal charges stored in the sensors 11a of odd-numbered lines are fed to the electrodes having the application of V1 in the vertical shift registers 11b in response to the transition of V1 to VH. Subsequently, second signal charges stored in the sensors 11a of even-numbered lines are fed to the electrodes having the application of V3 in the vertical shift registers 11b in response to the transition of V3 to VH. Subsequently, at the transition of V2 from VL to VM, the first and second signal charges are summed at the electrodes having the application of V1 through V3. The signal charges summed in the vertical shift registers 11b are shifted sequentially in the vertical direction in the successive horizontal periods. Accordingly, in the case of the field readout pattern 1 and for an odd-numbered line n, the image signal of one line is obtained based on the summation of signal charges of line n and line n−1.

FIG. 6C shows the vertical shift pulses V1 to V4 of pattern 2. With pattern 2 being applied to the imaging device 11, first signal charges stored in the sensors 11a of odd-numbered lines are fed to the electrodes having the application of V1 in the vertical shift registers 11b in response to the transition of V1 to VH. Subsequently, second signal charges stored in the sensors 11a of even-numbered lines are fed to the electrodes having the application of V3 in the vertical shift registers 11b in response to the transition of V3 to VH. Subsequently, at the transition of V4 from VL to VM, the first and second signal charges are summed at the electrodes having the application of V3 through V1. The signal charges summed in the vertical shift registers 11b are shifted sequentially in the vertical direction in the successive horizontal periods. Accordingly, in the case of the field readout pattern 2 and for an odd-numbered line n, the image signal of each line is obtained based on the summation of signal charges of line n and line n+1.

The sync signal generator 15 is supplied from the system controller 13 in correspondence to the selected sync signal with a signal SPI for designating a sync signal pattern. When the first sync signal for sequential scanning is selected, the sync signal generator 15 generates a horizontal sync signal HD (shown in FIG. 7F) which is synchronous with the video signal output from the image signal processor, which will be explained later, and a vertical sync signal VD (shown in FIG. 7E) which corresponds to 562 horizontal periods of the first field and 563 horizontal periods of the second field. When the second sync signal for skip scanning is selected, the sync signal generator 15 generates a horizontal sync signal HD (shown in FIG. 7D) which is synchronous with the video signal output from the image signal processor and a vertical sync signal VD (shown in FIG. 7C) which corresponds to 562.5 horizontal periods of the first and second fields. FIG. 7A shows the vertical drive signal AVD, and FIG. 7B shows the horizontal drive signal AHD.

The solid-state imaging apparatus 10 further includes a sample-holding circuit 17 which functions to eliminate the unnecessary reset state of the image signal IM produced by the imaging device 11, an automatic gain control (AGC) circuit 18 which maintains the image signal output from the sample-holding circuit 17 at a constant amplitude, an image signal processor 19 which implements the gamma process, clamping process, clipping process, profile modification process, blanking pulse mixing process, etc. for the constant-amplitude image signal provided by the AGC circuit 18, a sync signal adding circuit 20 which adds the vertical and horizontal sync signals VD and HD output from the sync signal generator 15 to the video signal output from the image signal processor 19 to produce an output video signal $SV_{out}$, and an output terminal 21 which outputs the output video signal $SV_{out}$.

Next, the operation of the solid-state imaging apparatus 10 shown in FIG. 4 will be explained. When the first mode is selected by the user's operation on the key panel 14, the system controller 13 issues to the timing signal generator 16 the pattern designation signal FPI for specifying pattern 2 for the first and second fields as a field readout pattern. Consequently, for each odd-numbered line n, the imaging device 11 produces the image signal of each line based on the summation of signal charges of line n and line n+1 for the first and second fields.

Specifically, for the first field, the imaging device 11 produces based on its line arrangement shown in FIG. 8A the image signals of each line as shown in FIG. 8B. Similarly, for the second field, the imaging device 11 produces based on its line arrangement shown in FIG. 8C the image signals of each line as shown in FIG. 8D. Accordingly, the first and the second fields have the same correspondence of the line image signals to the line positions, and the produced image signal IM is used to obtain the sequentially-scanned video signal SVn.

FIGS. 9A to 9D show the vertical drive signal AVD, horizontal drive signal AHD, vertical shift pulses V1 to V4 and image signal IM when the first mode is selected. It should be noted that the waveforms of the vertical shift pulses V1 to V4 shown in FIG. 9C are not accurate in their time axis direction. Their actual waveforms of the vertical shift pulses V1 to V4 in the horizontal periods TH1 and TH2 for reading out the first and second fields and in the immediately following horizontal periods are as shown in FIG. 6C, and the waveforms of the vertical shift pulses V1 to V4 in other horizontal periods are those of the horizontal periods TH1 and TH2 excluding the portions pertinent to readout. The numbers put to the image signal IM shown in FIG. 9D indicate the correspondence to the line numbers of the imaging device 11 in which the signal charges are stored.

When the second mode is selected by the user's operation on the key panel 14, the system controller 13 issues to the timing signal generator 16 the pattern designation signal FPI for specifying pattern 1 for the first field and pattern 2 for the second field as field readout patterns. Consequently, for each odd-numbered line n, the imaging device 11 produces the image signal of each line based on the summation of signal charges of line n and line n−1 for the first field and based on the summation of signal charges of line n and line n+1 for the second field.

Figures 10A, 10B:
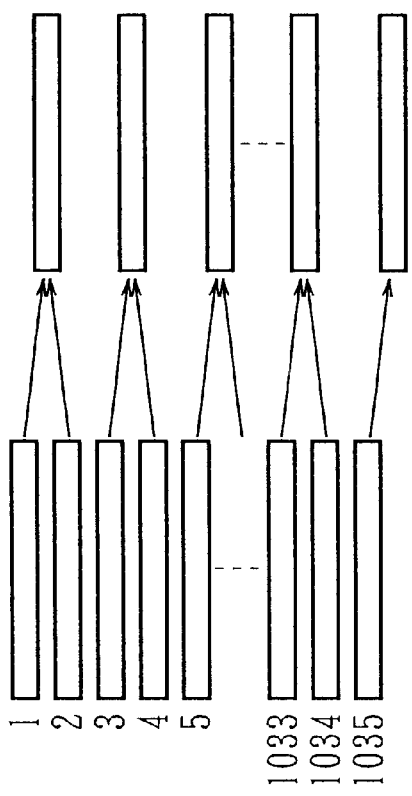
FIGS. 10A through 10D are diagrams used to explain the image signals of the first and second fields when the second mode is selected.
Figures 10C, 10D:
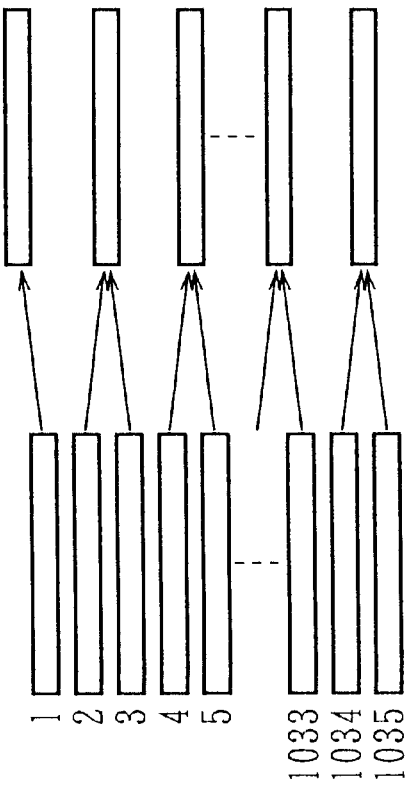

Specifically, for the first field, the imaging device 11 produces based on its line arrangement shown in FIG. 10A the image signals of each line as shown in FIG. 10B. Similarly, for the second field, the imaging device 11 produces based on its line arrangement shown in FIG. 10C the image signals of each line as shown in FIG. 10D. Accordingly, the first and second fields have a displaced correspondence of the line image signals to the line positions, and the produced image signal IM is used to obtain the skip-scanned video signal SVi.

FIGS. 11A to 11D show the vertical drive signal AVD, horizontal drive signal AHD, vertical shift pulses V1 to V4 and image signal IM when the second mode is selected. It should be noted that the waveforms of the vertical shift pulses V1 to V4 shown in FIG. 11C are not accurate in their time axis direction. Their actual waveforms of the vertical shift pulses V1 to V4 in the horizontal period TH1 for reading out the first field and in the immediately following horizontal period are as shown in FIG. 6B, their actual waveforms of the vertical shift pulses V1 to V4 in the horizontal period TH2 for reading out the second field and in the immediately following horizontal period are as shown in FIG. 6C, and the waveforms of the vertical shift pulses V1 to V4 in other horizontal periods are those of the horizontal periods TH1 and TH2 excluding the portions pertinent to readout. The numerals put to the image signal IM shown in FIG. 11D indicate the correspondence to the line numbers of the imaging device 11.

The image signal IM produced by the imaging device 11 is fed to the sample-holding circuit 17, by which the unnecessary reset state of the signal is eliminated. The resulting image signal from the sample-holding circuit 17 is fed through the AGC circuit 18 to the image signal processor 19, which implements the gamma process, clamping process, clipping process, profile modification process, blanking pulse mixing process, etc. to produce the video signal. The video signal output from the image signal processor 19 is fed to the sync signal adding circuit 20, which adds the vertical and horizontal sync signals VD and HD generated by the sync signal generator 15 to the video signal to produce the output video signal $SV_{out}$.

In case the first sync signal for sequential scanning is selected by the user's operation on the key panel 14, the sync signal generator 15 generates the first sync signal, i.e., the horizontal sync signal HD (shown in FIG. 7F) which is synchronous with the video signal output from the image signal processor 19, and the vertical sync signal VD (shown in FIG. 7E) which corresponds to 562 horizontal periods of the first field and 563 horizontal periods of the second field. The sync signal adding circuit 20 adds these sync signals HD and VD to the video signal. In case the second sync signal for skip scanning is selected by the user's operation on the key panel 14, the sync signal generator 15 generates the second sync signal, i.e., the horizontal sync signal HD (shown in FIG. 7D) which is synchronous with the video signal output from the image signal processor 19, and the vertical sync signal VD (shown in FIG. 7C) which corresponds to 562.5 horizontal periods of the first and second fields. The sync signal adding circuit 20 adds these sync signals HD and VD to the video signal.

With the first mode being selected, the image signal IM produced by the imaging device 11 causes the image signal processor 19 to produce the sequentially-scanned video signal SVn. In this case, by selecting the first sync signal for sequential scanning, the output video signal $SV_{out}$ for making a good image display based on the sequentially-scanned video signal SVn can be obtained. Alternatively, with the second mode being selected, the image signal IM produced by the imaging device 11 causes the image signal processor 19 to produce the skip-scanned video signal SVi. In this case, by selecting the second sync signal for skip scanning, the output video signal $SV_{out}$ for making a good image display based on the skip-scanned video signal SVi can be obtained.

For using the output video signal $SV_{out}$ for other purpose than display, e.g., for recording, the user is allowed to select the second sync signal for skip scanning, even with the image signal processor 19 producing the sequentially-scanned video signal SVn, or select the first sync signal for sequential scanning, even with the image signal processor 19 producing the skip-scanned video signal SVi.

In this embodiment, as described above, when the first mode is selected, the imaging device 11 produces such image signal IM as for the image signal processor 19 to produce sequentially-scanned video signal SVn. Therefore, the sequentially-scanned video signal SVn can be produced easily without using an expensive scanning converter which has been used by the conventional system.

When the second mode is selected, the imaging device 11 produces such image signal IM as for the image signal processor 19 to produce skip-scanned video signal SVi. Accordingly, the user can obtain the sequentially-scanned video signal SVn or skip-scanned video signal SVi arbitrarily by merely having the mode selecting operation on the key panel 14.

Furthermore, the sync signal generator 15 generates the first sync signal for sequential scanning or the second sync signal for skip scanning in accordance with the user's sync signal selection. Accordingly, it is possible to obtain for the output video signal $SV_{out}$ the sequentially-scanned video signal SVn or skip-scanned video signal SVi, with the first sync signal or second sync signal being added thereto, depending on the purpose.

Although the foregoing embodiment generates, as the first sync signal for sequential scanning, the vertical sync signal VD which corresponds to 562 horizontal periods of the first field and 563 horizontal periods of the second field, it may be designed to generate the vertical sync signal VD which corresponds to 563 horizontal periods of the first field and 562 horizontal periods of the second field.

Although the foregoing embodiment designates pattern 2 as a field readout pattern for the first and second fields in response to the selection of the first mode, the field readout pattern in this mode may be pattern 1 instead of pattern 2.

Although the foregoing embodiment designates pattern 1 for the first field and pattern 2 for the second field as field readout patterns in response to the selection of the second mode, the field readout pattern in this mode may be pattern 2 for the first field and pattern 1 for the second field.

Although the foregoing embodiment uses the imaging device 11 having 1035 lines and produces sequentially-scanned video signal SVn of 562.5 lines and skip-scanned video signal SVi of 1035 lines, these values are solely examples and the present invention is not confined by these values obviously.

Although the foregoing embodiment uses the CCD-based solid-state imaging device 11 of the inter-line transfer type, it may use a CCD-based solid-state imaging device of other types such as the frame inter-transfer type, or may use a solid-state imaging device which is not based on CCD.

What is claimed is:

1. A solid-state imaging apparatus comprising:
   a solid-state imaging device for producing an image signal of each line based on the summation of signal charges of two adjacent lines;
   drive means for driving said solid-state imaging device;
   control means for controlling said drive means such that, with every second line being numbered line n, the two adjacent lines of the alternately-consecutive first and second fields are line n and line n−1, or line n and line n+1; and
   signal processing means for processing the image signal output from said solid-state imaging device to produce a sequentially-scanned video signal of m/2 lines (m is an odd number).

2. A solid-state imaging apparatus according to claim 1, wherein said number m is 1125, and said solid-state imaging device has 1035 lines.

3. A solid-state imaging apparatus according to claim 1 further comprising:
   sync signal generation means for generating a horizontal sync signal which is synchronous with the video signal output from said signal processing means and a vertical sync signal which corresponds to (m−1)/2 horizontal periods of the first field and (m+1)/2 horizontal periods of the second field or corresponds to (m+1)/2 horizontal periods of the first field and (m−1)/2 horizontal periods of the second field; and
   sync signal adding means for adding the horizontal sync signal and vertical sync signal generated by said sync signal generation means to the video signal output from said signal processing means.

4. A solid-state imaging apparatus according to claim 1 further comprising:
   sync signal generation means for generating a horizontal sync signal which is synchronous with the video signal produced by said signal processing means and a vertical sync signal which corresponds to m/2 horizontal periods of the first and second fields; and
   sync signal adding means for adding the horizontal sync signal and vertical sync signal generated by said sync signal generation means to the video signal output from said signal processing means.

5. A solid-state imaging apparatus according to claim 1, wherein said solid-state imaging device comprises a CCD-based solid-state imaging device of the inter-line transfer type.

6. A solid-state imaging apparatus according to claim 1, wherein said solid-state imaging device comprises a CCD-based solid-state imaging device of the frame inter-transfer type.

7. A solid-state imaging apparatus comprising:
   a solid-state imaging device for producing an image signal of each line based on the summation of signal charges of two adjacent lines;
   drive means for driving said solid-state imaging device;
   control means for controlling said drive means such that, with every second line being numbered line n, the two adjacent lines of the alternately-consecutive first and second fields are line n and line n−1, or line n and line n+1 in a first mode, and the two adjacent lines of the first field are line n and line n−1 and the two adjacent lines of the second field are line n and line n+1 in a second mode;
   mode selection means for selecting one of said first mode and second mode; and
   signal processing means for processing the image signal output from said solid-state imaging device to produce a sequentially-scanned video signal of m/2 lines (m is an odd number) in the first mode, and for producing a skip-scanned video signal of m lines in the second mode.

8. A solid-state imaging apparatus according to claim 7, wherein said number m is 1125, and said solid-state imaging device has 1035 lines.

9. A solid-state imaging apparatus according to claim 7 further comprising:

sync signal generation means for generating a horizontal sync signal which is synchronous with the video signal output from said signal processing means, and a first vertical sync signal which corresponds to (m−1)/2 horizontal periods of the first field and (m+1)/2 horizontal periods of the second field or corresponds to (m+1)/2 horizontal periods of the first field and (m−1)/2 horizontal periods of the second field or a second vertical sync signal which corresponds to m/2 horizontal periods of the first and second fields;
   sync signal selection means for selecting one of the first vertical sync signal and the second vertical sync signal as a vertical sync signal to be generated by said sync signal generation means; and
   sync signal adding means for adding the horizontal sync signal and vertical sync signal generated by said sync signal generation means to the video signal output from said signal processing means.

10. A solid-state imaging apparatus according to claim 7, wherein said solid-state imaging device comprises a CCD-based solid-state imaging device of the inter-line transfer type.

11. A solid-state imaging apparatus according to claim 7, wherein said solid-state imaging device comprises a CCD-based solid-state imaging device of the frame inter-transfer type.

* * * * *